United States Patent [19]

Scholze et al.

[11] 4,140,510
[45] Feb. 20, 1979

[54] PROCESS FOR DISINTEGRATING MATERIAL CONTAINING ALKALI-ALKALI EARTH SILICATE FOR YIELDING ALKALI SILICATE OR ALKALI CARBONATE SOLUTIONS AND MATERIALS HAVING A LARGE SPECIFIC SURFACE

[75] Inventors: Horst Scholze, Würzburg; Milan A. Koutecky, Kist; Ivan V. Bakardjiev, Würzburg, all of Fed. Rep. of Germany

[73] Assignee: Fraunhofer-Gesellschaft zur Forderung der angewandten Forschung e.V., Fed. Rep. of Germany

[21] Appl. No.: 803,912

[22] Filed: Jun. 6, 1977

[30] Foreign Application Priority Data

Jun. 16, 1976 [DE] Fed. Rep. of Germany ....... 2626885

[51] Int. Cl.² .............................................. C03B 1/00
[52] U.S. Cl. ...................................... 65/28; 65/30 R; 423/339
[58] Field of Search ................... 423/340, 339; 65/28, 65/30 R

[56] References Cited

U.S. PATENT DOCUMENTS

| 2,182,384 | 12/1939 | McGregor | 423/340 |
| 3,172,726 | 3/1965 | Burke, Jr. et al. | 423/339 |
| 3,172,727 | 3/1965 | Burke, Jr. et al. | 423/339 |

Primary Examiner—Arthur D. Kellogg
Attorney, Agent, or Firm—John C. Smith, Jr.

[57] ABSTRACT

A process for disintegrating material containing alkali-alkali earth silicate for yielding alkali silicate or alkali carbonate solutions and materials having a large specific surface is characterized in that a material containing silicate is crushed and subsequently is treated in an autoclave at a temperature in excess of 100° C., preferably in excess of 130° C., with a solution containing alkali carbonate.

5 Claims, 1 Drawing Figure

USE OF THE GLASS BY AUTOCLAVE DISINTEGRATION

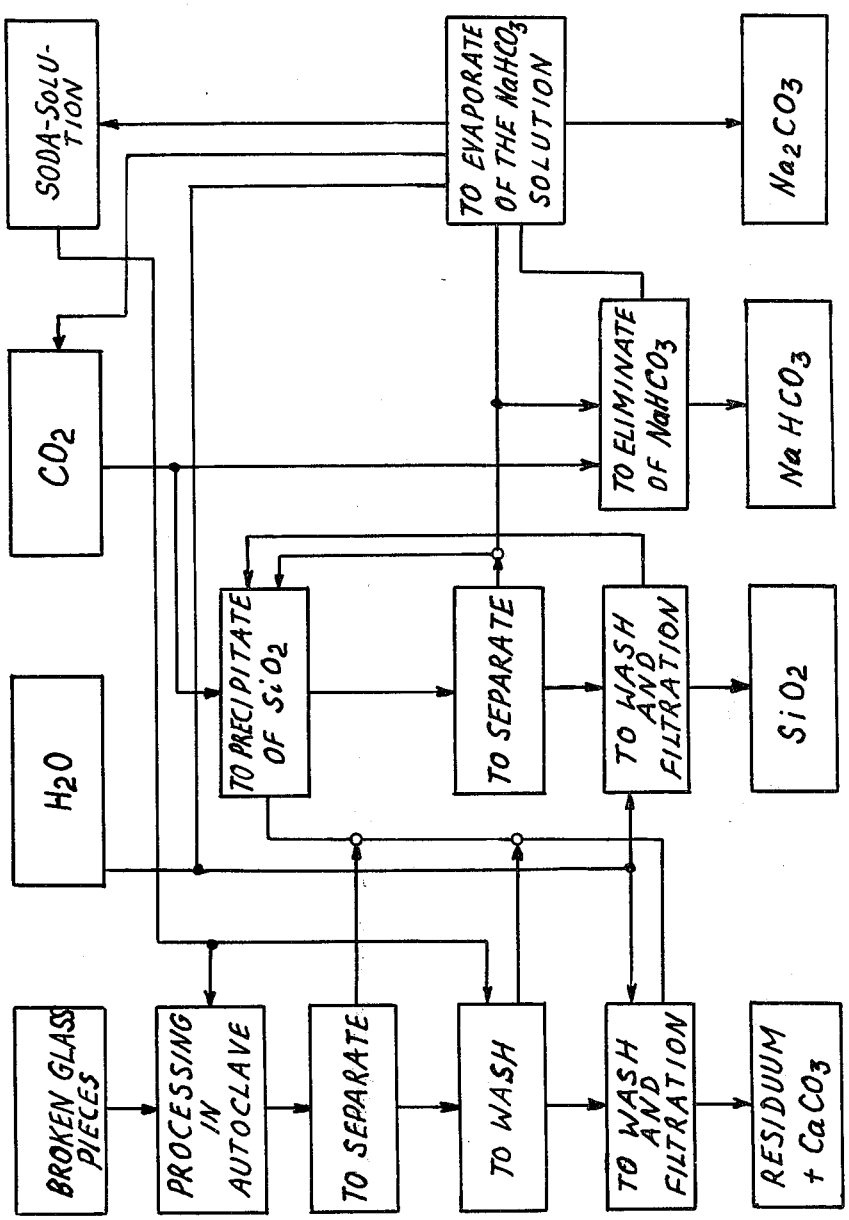

PROCESS FOR DISINTEGRATING MATERIAL CONTAINING ALKALI-ALKALI EARTH SILICATE FOR YIELDING ALKALI SILICATE OR ALKALI CARBONATE SOLUTIONS AND MATERIALS HAVING A LARGE SPECIFIC SURFACE

BACKGROUND OF THE INVENTION

The production of glasses is presently the occupation of a major branch of industry. This production also brings about some problems, e.g. pieces of broken glass are a by-product of all such glass manufacturing processes. Broken pieces of glass also result from the use of glass articles. The increasing volume of discarded glass pieces renders the problem more and more serious, since the glass industry is not readily able to use these volumes for glass production again. The main difficulties result from the different chemical compositions and the contamination of the broken glass pieces. For this reason, attempts have been made to re-use this glass waste, and thus promote the utilization of this valuable raw material reservoir. As known the literature, the glass waste is considered to be inferior material. Glass waste is used with more or less success e.g. as an additive for asphalt and cement and for the production of glass-clay bricks, foam glasses, glass wool, etc. Because the issue of raw material resources is coming more and more into the foreground and because of the problems of ecology, the need to use glass waste is becoming more and more a necessity.

In the production of glass, soda ($Na_2CO_3$) is one of the most costly materials. The production of soda alone in large quantities is not a raw material problem it is produced from sodium chloride. But as a by-product of this production, $CaCl_2$ is produced, for which up to now hardly any use has been found. Consequently, it is desirable to recover the alkali from waste glass. The present invention discloses a process for the treatment of broken glass pieces, wherein by a hydrothermal, alkaline disintegration of the glass on the one hand recovery of alkali is achieved and on the other hand materials having a large specific surface are obtained.

The production of alkali silicate solutions by a disintegration of $SiO_2$ materials with NaOH solutions is known in the art. By means of such wet processes, water glass of high purity is also produced. The use of different materials which are not composed of $SiO_2$ exclusively brings about difficulties, however. The yield of $SiO_2$ is low, because either there are small amounts of soluble silicates from the start soluble silicates are formed during the process. It is, for instance, known that disintegration with NaOH solution is used for perlite rock and nepheline syenites, wherein next to the alkali silicate solution a residue of aluminosilicate nature is produced. In some instances after various treatments products having an increased alkali-soluble $SiO_2$ content are obtained.

One possibility is for insstance, to provide, as a first step, a maceration. Serpentines may also be used for the production of water glass. A process is also known wherein alkali- and alumina-containing rocks are melted, quenched, and macerated with acid and then subsequently are treated with NaOH solution in order to produce an alkali silicate solution.

It will thus be appreciated that the economical disintegration of $SiO_2$-containing materials with NaOH solutions depends on what yield is possible. This determines what starting materials are used or what pretreatment is required. When the usual alkali silicate glasses are to be judged under this aspect, it has to be considered that the alkali earth content shares the second and third place with the alkali proportion in the composition. Under hydrothermal, alkaline conditions, low-soluble calcium hydro silicate phases can form. In this way, $SiO_2$ can be dissolved only in a limited amount.

DESCRIPTION OF THE PREFERRED EMBODIMENTS

The instant invention offers a new possibility for performing the alkaline disintegration without a preceding treatment of the glass being required. It has surprisingly been found that alkali silicate or alkali carbonate solution as well as materials having a large specific surface are obtained when material containing silicate is crushed and subsequently is treated in an autoclave at a temperature in excess of 100° C., preferably in excess of 130° C., up to about 200° C. with a solution containing alkali carbonate. The disintegration can be accelerated by the addition of alkali hydroxide.

Pure silica can be precipitated by carbonization from the alkali silicate solution produced upon disintegration of the material containing silicate and may be yielded for the renewed use in a solution containing alkali carbonate, so that a recycle process is carried out. During the process the that calcium is separated by the presence of $CO_3^{2-}$ ions. Thereby, the $CO_3^{2-}$ ions are spent, and thus a negative effect on the solubility of the $SiO_2$ is limited. Investigations conducted acknowledge these expectations. When disintegrating alkali silicate glasses of a usual composition with an alkaline solution containing carbonate, a residue and an alkali silicate solution are produced The residue is composed of calcite and the remainder mainly contains $SiO_2$, $Al_2O_3$ and MgO. The most important thing is that it is present in highly dispersed form and is capable of being used as absorbent and filler, respectively.

The alkali silicate solution may have a composition the $Na_2O$ content of which corresponds to a yield of more than 80% and the $SiO_2$ content of which corresponds to a yield of more than 75%. The further processing of this solution by precipitation of $SiO_2$ by means of $CO_2$ also permits an alkali carbonate solution to be obtained the re-use of which permits a favorable cyclic performing of the process. The precipitated $SiO_2$ has a large specific surface and a high chemical purity, caused by the fact that in the presence of $CO_3^{2-}$ ions in the solution the transfer of other components is buffered. The figure is a flow sheet illustrating the steps of the novel glass disintegration process.

EXAMPLE 1

10.00 g of finely crushed brown bottle glass pieces (particle size less than 100 μm; composition in % by weight: 72.6 $SiO_2$, 11.4 $Na_2O$, 0.8 $K_2O$, 11.4 CaO, 1.7 MgO, 1.7 $Al_2O_3$, 0.3 $Fe_2O_3$) were treated with 10.00 g $Na_2CO_3$ and 30 g $H_2O$ in a rotating autoclave at 200° C. for 1 h.

The following was produced:
(a) 4.33 residue dried at 200° C. having a specific surface of 229 $m^2/g$.
(b) An alkali silicate solution having the following contents: 5.44 g $SiO_2$, 6.84 g $Na_2O$, 0.07 g $K_2O$, 0.015 g CaO and 0.09 g $Al_2O_3$. From this solution, 4.67 g $SiO_2$ with 0.086 g $Al_2O_3$ was precipitated by $CO_2$ (at normal pressure and room temperature). The specific surface of this sample was 600 m²/g.

EXAMPLE 2

15.00 g glass like in Example 1 was treated with 10.00 g $Na_2CO_3$ and 30 g $H_2O$ in a rotating autoclave at 200° C. for 1 h.

The following was yielded:

(a) 6.96 g residue having a specific surface of 190 m²/g.

(b) An alkali silicate solution having the following components: 7.75 g $SiO_2$, 7.18 g $Na_2O$, 0.10 g $K_2O$, 0.012 g CaO, and 0.014 g $Al_2O_3$. From the solution 6.91 g $SiO_2$ with 0.01 g $Al_2O_3$ were precipitated by $CO_2$ (at normal pressure and room temperature). The specific surface of this sample was 550 m²/g.

EXAMPLE 3

15.00 g glass (like in Examples 1 and 2) were treated with 10.00 g $Na_2CO_3$ and 30 g $H_2O$ in an autoclave at 200° C. for 1 h.

5.67 g residue having a specific surface of 280 m²/g were obtained. After washing with diluted HCl, a rest of 2.63 g was maintained having a specific surface of 410 m²/g.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

We claim:

1. A process for disintegrating material containing an alkali-alkali earth silicate for yielding alkali silicate solutions and materials having a large specific surface, comprising the steps of:
   (a) crushing a silicate-containing material;
   (b) forming a mixture of substantial proportions of said crushed silicate-containing material, alkali carbonate and water;
   (c) subjecting said mixture in an autoclave to a temperature in excess of 100° C. up to about 200° C. to cause hydrothermal, alkaline disintegration of said silicate-containing material and form an alkali silicate solution; and
   (d) subjecting said alkali silicate solution to carbon dioxide to precipitate $SiO_2$ and reclaim an alkali carbonate solution.

2. A process according to claim 1 wherein said mixture is subjected to a temperature in excess of 130° C.

3. A process according to claim 1 wherein said silicate-containing material is glass.

4. A process according to claim 1 wherein said alkali carbonate is $Na_2CO_3$.

5. A cyclic process for disintegrating material containing alkali silicate comprising the steps set forth in claim 3 and the further step of utilizing said alkali carbonate in Step b) of claim 3.

* * * * *